United States Patent Office 3,540,870
Patented Nov. 17, 1970

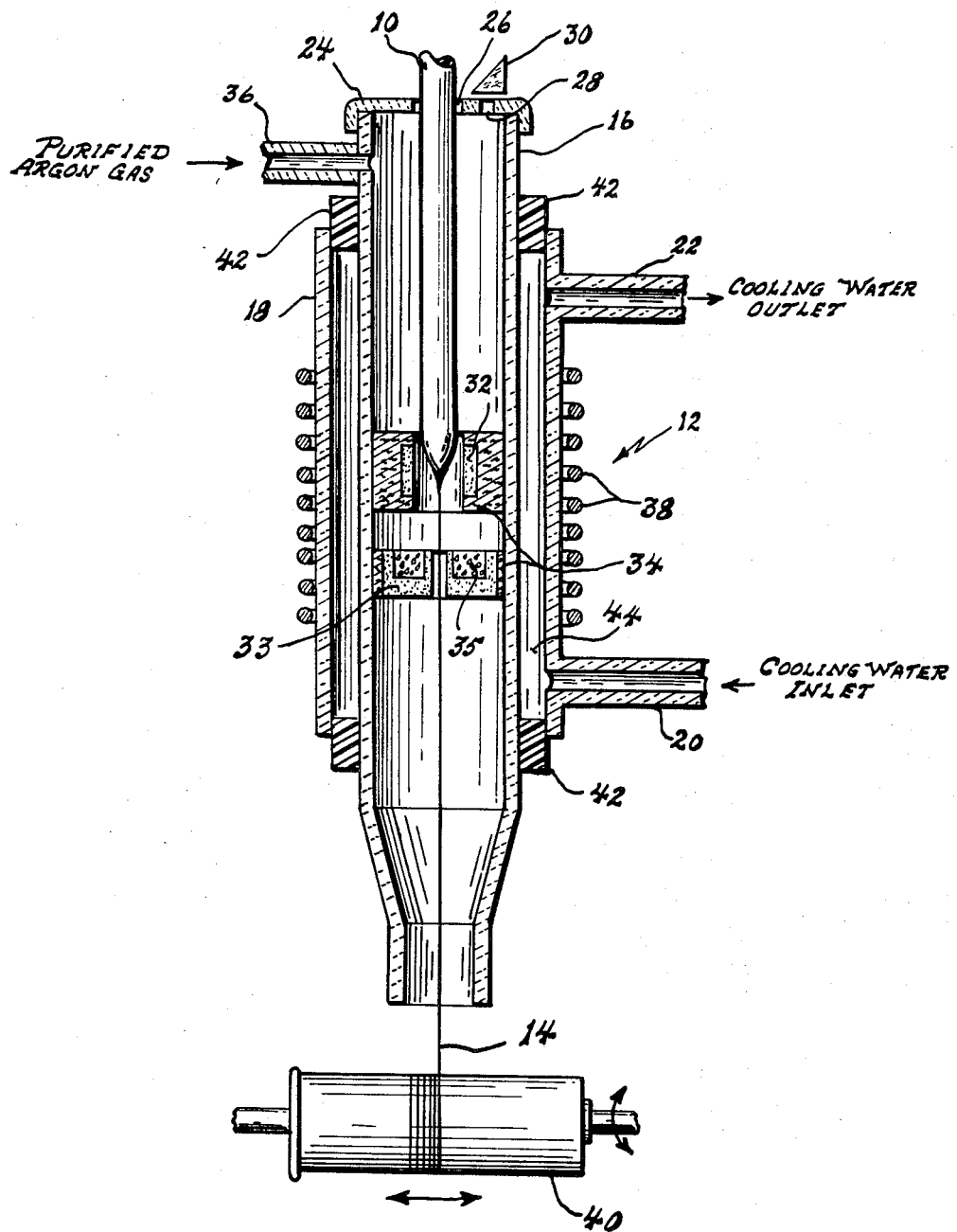

3,540,870
APPARATUS FOR DRAWING AND COATING QUARTZ GLASS FIBERS
Pei Ching Li, Northbrook, Ill., assignor to the United States of America as represented by the Secretary of the Air Force
Filed May 7, 1968, Ser. No. 727,761
Int. Cl. C03b 37/04
U.S. Cl. 65—11              1 Claim

ABSTRACT OF THE DISCLOSURE

A quartz glass fiber drawing and coating apparatus having an induction coil type of furnace through which the quartz glass fiber is drawn at a linear rate on the order of 340 feet per minute and is coated with vaporized magnesium fluoride. The magnesium fluoride pellets are vaporized in a graphite susceptor which is suspended in the zone through which the quartz glass fiber is drawn.

BACKGROUND

The transmission of light along a transparent dielectric cylinder is due to multiple total internal reflections. The radiant energy is reflected at the walls of the transparent solid cylinder or "light pipe" and is thus transmitted along the configuration of the transparent cylinder. The light rays strike the walls of the cylinder at angles $\theta$, which are greater than a certain critical angle of incidence and are totally reflected. The critical angle $\theta_c$ depends on the index of refraction of the material for the particular radiation. It is approximately 42° for visible light in glass and for ultraviolet radiation in Suprasil quartz.

If the cylindrical surface is clean and free from imperfections, all rays which enter one end will be trapped within the cylinder and emerge from the other end. For a clean, uniform, and straight fiber, the only loss is that produced by absorption in the medium. Furthermore, the incident cone of light is preserved, in spite of the multiple reflections, so that the exit cone subtends the same angle as the incident cone. If the fiber is bent, the exit cone of radiation may be increased but will not be substantially greater than the 42° cone specified by the numerical aperture of the fiber.

Freshly drawn uncoated glass fibers closely approximate the conditions assumed above, but they will not retain these properties for any length of time in typical environments. Atmospheric fumes containing grease and dust will inevitably produce a coating which scatters light out of the cylinder and destroys the trapping effect required for transmission. The problem is conventionally solved by coating the fiber with a glass having a lower refractive index than that of the core material. This coating provides an internally protected interface at which surface total internal reflections will occur. The dirt which accumulates on the coated fibers will then have no effect on the interface properties which are so essential for total internal reflection. This coating also provides the optical insulation which eliminates "crosstalk" or interchange of energy between fibers when they are brought into close proximity.

In the well established technology of visible fiber optics, the coating process is accomplished at the time the fibers are drawn. The core material as a rod, inside a hollow tube of the coating material, is introduced to a vertical furnace. The glass softens, the two materials fuse and are drawn as a coated fiber. It should be noted that the two materials must be compatible with respect to coefficient of expansion and other thermal properties. The requirement of a perfect match of coefficient of expansion is not absolute and some mismatch can be tolerated. When this mismatch condition exists, it is desirable that the coefficient of expansion of the core be greater than that of the coating because stronger fibers are obtained when the coating is under compressional stress.

Therefore, success in the realm of visible fiber optics is attributable, in a very high degree, to the relative ease with which high quality coated fibers may be produced in a single operation by simultaneous fusion of a high index rod and a lower index tube, the former enclosed within the latter. Incompatibility of the ultraviolet materials has, up to now, prohibited such a simple one-step approach in the realm of ultraviolet fiber optics.

Once success is achieved in fabricating quartz fiber by a suitable high temperature drawing technique, the immediate requirement is to select an ultraviolet cladding material with a suitable index of refraction. Of course, the materials to be considered must be compatible with the core fiber and show no deterioration with use or age. The requirement of low index of refraction is met only by a very few materials, some of which are LiF, $CaF_2$, and $MgF_2$.

SUMMARY OF THE INVENTION

The quartz glass fiber drawing and coating furnace provides the means for continuously drawing quartz glass fibers without fiber breakage and with uniform fiber diameters, at linear rates up to 340 feet per minute and for continuously cladding the quartz glass fiber with magnesium fluoride while being so drawn. This technique provides a practical and convenient means for protecting the glass fiber from absorbing moisture and gases and thus preventing surface scratches and enhancing the strength characteristics of the glass fiber. The position of the lower susceptor was determined experimentally to maintain its temperature at approximately 1450° C. while the upper susceptor is positioned in a temperature zone of 2000° C. or more. During the operation of drawing, the quartz glass fiber is continuously shielded with argon gas. Thus, the fiber is protected from contaminants prior to its cladding with a coating of vaporized magnesium fluoride. A coating thickness of 13 A. to 16 A. is achieved by this method.

It is, therefore, one object of the invention to provide a furnace for simultaneously drawing quartz glass fibers while continuously coating with magnesium fluoride.

It is another object to provide a practical and convenient means for protecting the glass fiber from absorbing moisture, gases and other contaminants.

It is a further object to enhance the strength characteristics of the glass fiber by preventing surface scratches.

These and other advantages, features and objects of the invention will become more apparent from the following description taken in connection with the illustrative embodiment in the accompanying drawing, wherein the figure is a partial section view of a quartz glass fiber filament drawing and coating unit.

DESCRIPTION OF THE PREFERRED EMBODIMENT

As will be clear from the drawing, the process selected for producing quartz filaments is one in which a quartz rod 10 is inserted into an induction susceptor furnace 12 and heated so that its tip is soft enough to be pulled into a filament. By precise control of the feed and take-up mechanisms together with the furnace temperature, quartz fibers 14 can be drawn continuously. A partial sectional view of the unit is presented in the accompanying drawing.

The furnace consists of two concentric tubes, the inner tube 16 being clear quartz, 2 in. I.D. by 26 in. long, and the outer tube 18 being Vycor glass, 3½ in. I.D. by 16 in. long. Cooling water enters the bottom of the jacket through tube connection 20 and exists through upper tube connection 22. Rings 42 support the inner tube 16 within outer tube 18 and provide a seal for compartment 44 into which the cooling water flows. Graphite cap seal 24 used on top of inner tube 16 has a hole 26 in the center for the quartz rod 10 and a smaller hole 28 (plug not shown) on the side through which to measure temperature. An optical pyrometer (not shown) which utilizes prism 30 measures the temperature within the furnace. Inside the inner tube 16, a graphite ring susceptor 32 is accurately positioned at a predetermined point to achieve a desired temperature. A layer of carbon felt 34 which covers the outside of the susceptor, is used for thermal insulation and holds the graphite susceptor 32 in place by means of the press fit between the inner wall of tube 16 and the carbon felt 34. Prepurified argon gas is fed in tube 36 at the top of the unit to provide an inert atmosphere. The quartz rod 10 is held vertically by an overhead chuck (not shown) which is lowered gradually at a controllable speed.

The quartz fiber 14 is formed by heating and softening the quartz rod 10 positioned in the center of the graphite susceptor 32. Heating is accomplished with a Lindberg Induction unit 38 (L1–25A–1) having a maximum output capacity of 25 kw.

A 6½ in. diameter fiber "take-up" drum 40 with a controllable rotating speed and longitudinal movement permits the fiber to be wound in an orderly fashion. A dustproof closure (not shown) covers the bottom of the furnace to shield the take-up drum 40, preventing contamination of the fiber.

The simultaneous operation of drawing and coating with a protective coating the quartz glass fiber, is achieved by utilizing a second graphite susceptor 33 which contains magnesium fluoride pellets 35. The second graphite susceptor 33, which is below susceptor 32 used for drawing, is held in position by means of the press fit between the inner wall of tube 16 and the carbon felt covering 34. The lower graphite susceptor 33 is used as a heater to continuously vaporize the magnesium fluoride pellets 35 therein contained. The position of the lower graphite susceptor 33 was determined experimentally so as to maintain its temperature at approximately 1450° C. while the upper graphite susceptor 32 may reach 2000° C. or higher.

The temperature of the lower susceptor influenced the filament drawing process and while a higher temperature would be desirable in order to increase the vaporization rate of magnesium fluoride, $MgF_2$, it generally caused filament breakage. If the temperature of the lower susceptor is kept substantially below the melting point of magnesium fluoride, insufficient material is vaporized to provide a substantially uniform coating.

This furnace has proved satisfactory for the continuous drawing of quartz at linear rates up to 340 ft./min. without fiber breakage and with uniform fiber diameters and for simultaneously coating the fiber with vaporized magnesium fluoride with a substantially uniform thickness.

Although the invention has been described with reference to a particular embodiment, it will be understood to those skilled in the art that the invention is capable of a variety of alternate embodiments within the spirit and scope of the appended claim.

I claim:
1. An apparatus for simultaneously drawing and coating quartz glass fiber with a protective glass coating comprising, in combination, an induction furnace including inner and outer concentric glass tubes, upper and lower rings supporting and sealing said concentric glass tubes to form a watertight compartment, lower and upper outlet means for said compartment for the insertion and expulsion of $H_2O$ in said watertight compartment, a graphite cap for sealing said inner glass tube, said graphite cap having disposed therein first and second opening therethrough, said first opening in said graphite cap being disposed in the center thereof, said second opening in said graphite cap providing the means to take optical temperature measurements, induction heating means wound around the outside of said outer glass tube and positioned substantially at the center thereof, a first graphite susceptor position inside said inner glass tube adjacent to said heating means, said first graphite susceptor having an opening of preselected dimensions passing therethrough, a second graphite susceptor positioned below said first graphite susceptor also having an opening of preselected dimensions passing therethrough, said second graphite susceptor containing magnesium fluoride pellets; a quartz glass rod inserted through said first opening of said graphite cap and extending through said inner tube and partially in said opening of said first graphite susceptor, said induction heating means transmitting heat to said first graphite susceptor for melting said quartz rod to a threadlike fiber, said threadlike fiber then passing through said opening of said second graphite susceptor, said induction heating means transmitting heat to said second graphite susceptor for vaporizing said magnesium fluoride pellets to provide a coating for said threadlike fibers passing through said second graphite susceptor, a circular drum positioned at the lower end of said inner glass tube for uniformly drawing and winding said coated threadlike fiber on said circular drum.

References Cited

UNITED STATES PATENTS

| | | |
|---|---|---|
| 2,789,062 | 4/1957 | Cusano et al. |
| 3,045,278 | 7/1962 | Potter _____ 65—13 |
| 3,204,326 | 9/1965 | Granitsas. |
| 3,248,464 | 4/1966 | Telkes. |
| 3,276,853 | 10/1966 | Eakins _____ 65—3 |

S. LEON BASHORE, Primary Examiner

R. L. LINDSAY, JR., Assistant Examiner

U.S. Cl. X.R.

65—3, 12, 32; 117—126; 118—9, 49.5